United States Patent
Bezold et al.

(10) Patent No.: US 12,241,553 B2
(45) Date of Patent: Mar. 4, 2025

(54) VALVE HAVING AN OPTIMIZED SEAT GEOMETRY

(71) Applicant: BUERKERT WERKE GMBH & CO. KG, Ingelfingen (DE)

(72) Inventors: Christian Bezold, Ingelfingen (DE); Ralf Strasswiemer, Ingelfingen (DE)

(73) Assignee: BUERKERT WERKE GMBH & CO. KG (DE)

(*) Notice: Subject to any disclaimer, the term of this patent is extended or adjusted under 35 U.S.C. 154(b) by 50 days.

(21) Appl. No.: 18/198,792

(22) Filed: May 17, 2023

(65) Prior Publication Data

US 2023/0392695 A1    Dec. 7, 2023

(30) Foreign Application Priority Data

Jun. 7, 2022   (DE) ............... 10 2022 114 296.5

(51) Int. Cl.
*F16K 1/42* (2006.01)
*F16K 27/02* (2006.01)

(52) U.S. Cl.
CPC .............. *F16K 1/42* (2013.01); *F16K 27/029* (2013.01)

(58) Field of Classification Search
CPC ....... F16K 1/42; F16K 27/029; F16K 31/0655
USPC ...................................................... 251/359
See application file for complete search history.

(56) References Cited

U.S. PATENT DOCUMENTS

| | | | | |
|---|---|---|---|---|
| 4,688,755 A | * | 8/1987 | Pluviose | F01D 17/145 138/44 |
| 7,931,252 B2 | * | 4/2011 | Shindo | F16K 47/04 251/333 |
| 9,416,678 B2 | * | 8/2016 | Hamada | F16K 1/42 |
| 12,018,759 B1 | * | 6/2024 | Patel | F04B 53/1022 |
| 2002/0074043 A1 | * | 6/2002 | Beyer | F16K 47/00 137/587 |
| 2004/0051072 A1 | * | 3/2004 | Hardin | F16K 1/42 251/333 |
| 2009/0188573 A1 | * | 7/2009 | Dong | F16K 47/04 137/549 |
| 2010/0012869 A1 | | 1/2010 | Hild et al. | 251/129.01 |
| 2011/0042605 A1 | * | 2/2011 | Gyger | F16K 25/005 251/359 |
| 2011/0297868 A1 | * | 12/2011 | Nishimura | F01D 17/145 251/359 |

FOREIGN PATENT DOCUMENTS

| | | | | |
|---|---|---|---|---|
| DE | 102010043621 | | 5/2012 | ............... F16K 1/34 |
| JP | 2019011693 | | 1/2019 | ............... F02D 9/10 |

* cited by examiner

Primary Examiner — Jessica Cahill
(74) Attorney, Agent, or Firm — HAYES SOLOWAY P.C.

(57) ABSTRACT

The disclosure relates to a valve, in particular a solenoid valve, having an optimized seat geometry. The valve comprises a sealing element and a valve seat which surrounds a passage opening having a nominal diameter, the valve seat having on a side facing the sealing element a closed circumferential rounding which, in a cross-sectional plane which extends through a central axis of the passage opening, has a seat radius, a distance of a radius center of the seat radius from a wall inner side defining the passage opening being smaller than the seat radius.

19 Claims, 4 Drawing Sheets

Fig. 4- Prior Art
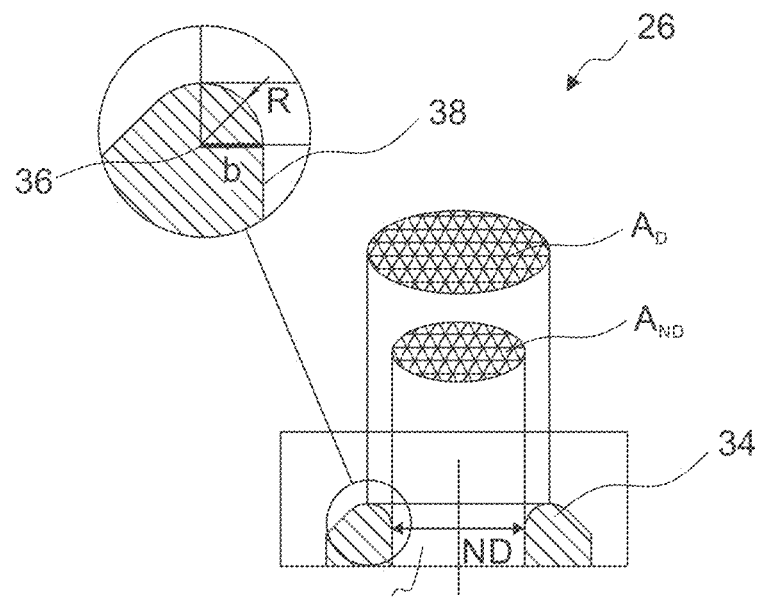
Fig. 5
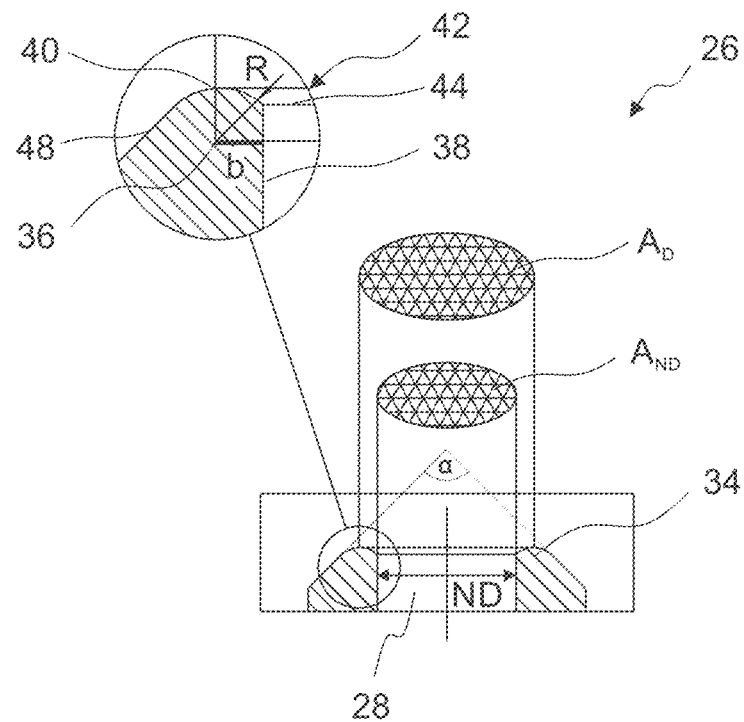

VALVE HAVING AN OPTIMIZED SEAT GEOMETRY

TECHNICAL FIELD

The disclosure relates to a valve having an optimized seat geometry.

BACKGROUND

Generic valves, for example solenoid and/or proportional valves, are generally designed to control a fluid flow, for example a liquid or gas flow. They typically consist of a sealing element which is pressed against a valve seat, thus closing a passage opening.

Valves are known in which the valve seat consists of an elevation surrounding the passage opening and having a predetermined seat radius R. The seat radius is defined in a cross-section in the sectional plane of which the central axis of the passage opening is located. Typically, this seat radius merges tangentially into the wall inner side of the passage opening.

A contact between the sealing element and the elevation results in a sealing line which encloses the passage opening and at which sealing takes place. In relation to a flat sealing element, the sealing line is the initial contact of the sealing element with the seat radius.

Depending on the application, the required flow rate and thus also the size of the passage opening and the valve seat vary. The necessary sealing force of the valve, or the necessary switching force of the actuator, can be determined via the nominal size of the valve seat and the medium pressure.

Due to limiting factors such as electrical power, installation space and heat, it is desirable to reduce the sealing force in the valve to a minimum. This also has a positive effect on the service life of the valve. For example, when operated with reduced sealing force, wear phenomena, such as punch-out effects of the mostly elastic sealing element due to repeated contact with the valve seat, only occur much later.

In conventional valves, however, the possibilities for reducing the sealing force are severely limited due to the simple geometric design.

The object of the disclosure is therefore to create a valve which manages with a comparatively low sealing force and at the same time ensures a reliable sealing.

SUMMARY

According to the disclosure, the object is achieved by a valve, in particular a solenoid valve, comprising a sealing element and a valve seat which surrounds a passage opening having a nominal diameter ND. The valve seat has on a side facing the sealing element a closed circumferential rounding which, in a cross-sectional plane which extends through a central axis of the passage opening, has a seat radius R. According to the disclosure, a distance b of a radius center es of the seat radius R from a wall inner side defining the passage opening is smaller than the seat radius R.

Due to this special arrangement of the radius center es of the seat radius R, the sealing line is shifted in the direction of the central line of the passage opening. As a result, the sealing area enclosed by the sealing line and the contact area between the sealing element and the valve seat are also reduced, which leads to a reduction in the force to be applied for a reliable sealing.

The radius center of the seat radius R is thus not arranged as in conventional valves such that a kink-free and tangential transition of the seat radius into the wall inner side of the passage opening is obtained. The rounding no longer has a single seat radius R, but forms a transition area to the wall inner side of the passage opening.

As a result, the sealing force to be set or the surface pressure acting between the sealing element and the valve seat when the seal is closed can, to a certain extent, be decoupled from the sealing surface. The force distribution and thus also the mechanical loads on the sealing element, or the valve seat, may thus be influenced independently of the seat radius R.

In particular, the use of the valve according to the disclosure is conceivable in the food sector and for hot water applications, as the choice of sealing materials is limited here and extreme conditions prevail in the working environment, which favor increased valve wear. This is because the reduced sealing force required compared to conventional valves also reduces the mechanical loads on the valve components, which in turn has a positive effect on the valve service life.

In a preferred embodiment, a ratio of the distance b to the seat radius R may be in a range from 0.375 to a maximum of 0.75. It has been shown in extensive tests that effective sealing can be achieved in this range with a lower sealing force. At the same time, valves designed in this way have a longer service life because there is only a comparatively small amount of edge formation at the transition from the elevation to the wall inner side of the passage opening.

In general, a transition area may be provided at this transition, in which the seat radius R merges into the wall inner side of the passage opening.

For example, the transition area may have an edge or a chamfer. Such geometric designs are particularly easy to manufacture, for example by introducing the passage opening by means of a drilling tool.

Alternatively, the transition area may have a transition rounding having a transition radius r which is smaller than the seat radius R. In particular, the transition radius r may also be smaller than the distance b and merge tangentially into the wall inner side of the passage opening. Steps or edges which can damage the sealing element upon repeated contact are thus avoided.

For example, the transition radius r may be between 0.05 mm and 0.15 mm, preferably 0.1 mm. Values in this range provide sufficient rounding. At the same time, production using conventional tools, for example by means of seat countersinks, is possible.

Alternatively or additionally, the transition area may have an increasing continuous curvature in the direction of the passage opening, which in particular merges tangentially into the wall inner side of the passage opening. This creates a particularly smooth transition, which positively influences the service life of the valve.

In a preferred embodiment, the valve seat defines an annular sealing line which, in the open state of the valve, corresponds to the point closest to the sealing element. The sealing line has a diameter which is smaller than the sum of the nominal diameter ND and twice the seat radius R. Such round valves are easy to manufacture, are particularly robust and lead to the desired reduction in sealing force. However, other valve geometries are of course also possible, for example having oval or square-shaped passage openings surrounded by corresponding sealing lines.

In particular, for round valve designs, it may be provided that the sealing line encloses a sealing area $A_D = \pi \ast (ND/2 +$ b)², for which the following applies: $\pi*(ND/2)^2 < A_D < \pi*(ND/2+R)^2$, where $\pi$ is the circular number. The sealing area $A_D$ is thus larger than the cross-section of the passage opening, but smaller than in conventional valves in which the seat radius R merges tangentially into the wall inner side of the passage opening. Thus, as already explained above, a sealing force reduction is achieved compared to conventional valves.

One aspect of the disclosure provides that the ratio of the seat radius R to the nominal diameter ND has a value which is in the range of 0.05 to a maximum of 0.5. It has been shown that in valves having such a geometric design, a reliable sealing can be achieved with a particularly low sealing force.

In particular, the nominal diameter ND may have a value which is between 0.5 mm and 6 mm. In this range, the achievable lifetime increase is particularly large because the contact surface between the sealing element and the valve seat is very small. This is because the small contact surface has the effect that even low applied valve closing forces result in high surface pressures between the sealing element and the valve seat, which in turn can promote crack formation and/or valve wear. The sealing force reduction counteracts these effects.

A further aspect of the disclosure provides that the valve comprises a housing, wherein the valve seat is a component of a housing part and/or is integrally connected to the housing part. This enables a simple manufacturing of the valve. For example, it is conceivable that the valve housing along with the valve seat is injection molded in a single process step. In addition, the valve is particularly robust due to the proposed integration of the valve seat into the housing.

In general, the housing part can delimit a fluid chamber. In particular, the valve seat may be a free end of a sleeve-like section projecting from the housing part. This design is technically simple to implement and provides good accessibility of the valve seat for the sealing element.

In a preferred configuration, the sealing element consists of an elastomer at least in a contact area with the valve seat. Due to the mechanical deformability thereof, a contact surface is formed between the valve seat and the sealing element in the closed valve state which is sufficiently large to ensure a reliable sealing function. Elastomers also have sufficient stability against numerous fluids.

To ensure a reliable sealing, it may further be provided that the sealing element has a flat surface facing the valve seat in the open state. When the valve is closed, the seat radius R can be pressed or formed therein so that a sufficiently large contact surface is created for the sealing function.

It is conceivable that in the fully closed state, the sealing element contacts the valve seat exclusively in the area of the seat radius R. By avoiding further contact points, in particular to edges or chamfers on the valve seat or in the transition area, a long service life of the valve is ensured.

It may further be provided that the seat radius R merges radially outwards into a cone section, the cone angle of which is preferably in the range of 80° to a maximum of 110°. This can prevent or at least reduce turbulences in the fluid flow as it passes through the valve.

In general, the area of the wall inner side from which the distance b to the radius center of the seat radius R is measured may have the nominal diameter ND.

In this context, the nominal diameter ND is understood to be the smallest opening diameter for cylindrical passage openings. Viewed from the sealing element, this is typically significantly below the plane in which the sealing line is formed when the valve is closed.

BRIEF DESCRIPTION OF THE DRAWINGS

FIG. 4 shows a schematic cross-sectional view of a conventional valve seat;

FIG. 5 shows a schematic cross-sectional view of a valve seat of a valve according to the disclosure in a first embodiment;

DETAILED DESCRIPTION

Figure 1:
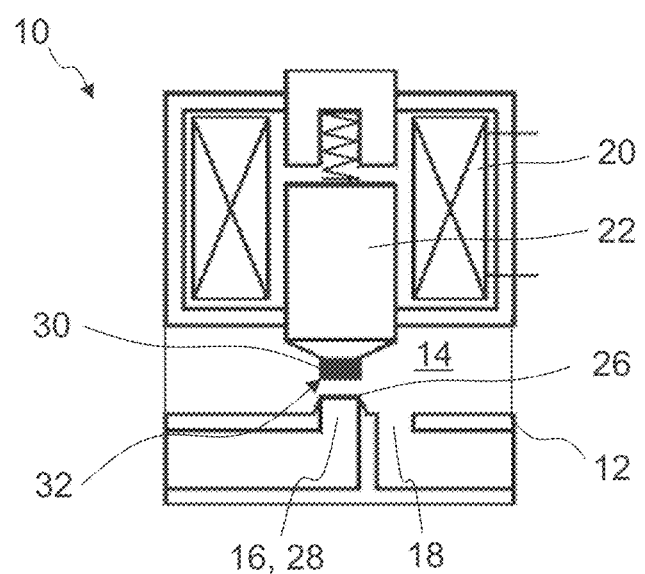
FIG. 1 shows a schematic sectional view of a valve according to the disclosure, which is designed as a lifting armature solenoid valve.

FIG. 1 shows a schematic sectional view of a valve 10 according to the disclosure. In the example embodiment, it is for example a lifting armature solenoid valve. The valve 10 comprises a housing 12, with a fluid chamber 14 enclosed therein, which has an inlet 16 and an outlet 18, as well as an armature 22, which is displaceable by means of solenoid coils 20 and is in the open position in FIG. 1.

The housing 12 can be an injection-molded component made of plastic, in particular of a glass-fiber-reinforced plastic. Alternatively, metal housings are also conceivable.

Figure 2:
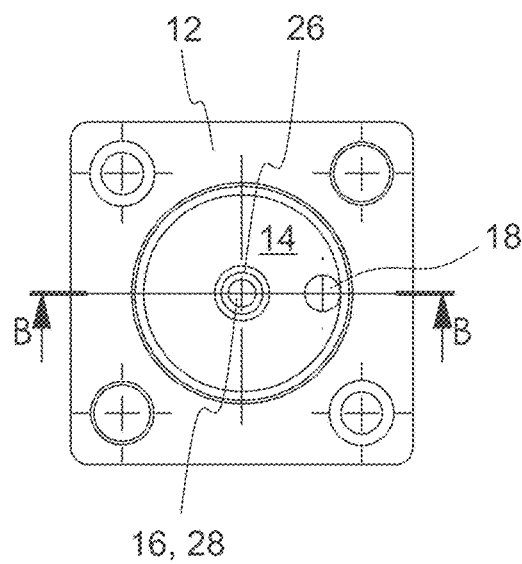
FIG. 2 shows a schematic top view of a housing and a fluid chamber of the valve of FIG. 1.
Figure 3:
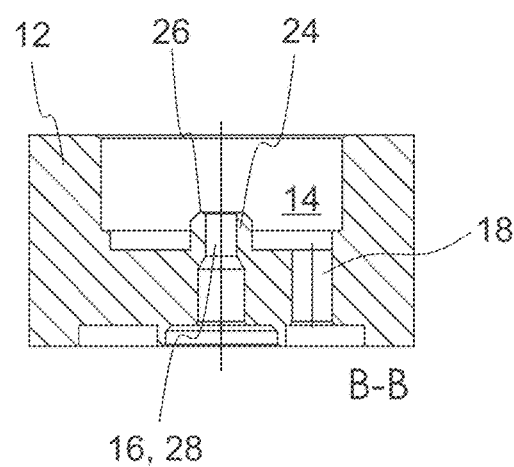
FIG. 3 shows a schematic cross-sectional view of the housing of FIG. 2.

The housing area with the fluid chamber 14 is shown in more detail in a plan view in FIG. 2 and in a sectional view in FIG. 3.

A part of the housing 12 forms a sleeve-like section 24 which projects from a bottom upwards into the fluid chamber 14. A valve seat 26 is located at a free end of the sleeve-like section 24 facing the armature 22. In the example embodiment, the housing 12, the sleeve-like section 24 and the valve seat 26 form a single, one-piece component.

In the embodiment shown, the valve seat 26 surrounds a passage opening 28 of the inlet 16. Of course, this is not to be understood in a restrictive way. Variant embodiments in which the valve seat 26 surrounds the outlet 18 are also conceivable. In other words, the valve 10 is suitable for an under-seat inflow and an over-seat inflow.

The armature 22 is arranged on a side of the fluid chamber 14 opposite the passage opening 28. A sealing element 30 which may be made of an elastomer material, such as a rubber is attached to the head of the armature 22.

In the example embodiment, the side of the sealing element 30 facing the valve seat 26 is a flat surface 32.

When the valve 10 is closed, the solenoid coils 20 displace the armature 22 in the direction of the passage opening 28 until the sealing element 30 reaches the valve seat 26. A force is applied to the armature 22 by means of the solenoid coils 20, which causes the sealing element 30 to be pressed against the valve seat 26 and close the passage opening 28 in a fluid-tight manner.

The force thus causes the upper area of the valve seat 26 to be pressed into the surface 32 of the sealing element 30. As a result, mechanical stresses act in the closed state, which can lead to wear of the sealing element 30, especially during continuous operation with repeated opening and closing processes.

To keep wear as low as possible, the valve 10 has a special valve seat geometry which allows operation with comparatively low closing forces.

The differences between the special valve seat geometry and valve seats 26 known from the prior art are explained below.

FIG. 4 shows a conventional valve seat 26, which is not the subject of the claimed disclosure. It encloses a circular passage opening 28 having a nominal diameter ND and has, on a side facing the sealing element 30, a circumferential rounding 34 with only the seat radius R. The seat radius, so to speak, runs around the valve seat 26 in a closed manner and defines the geometry thereof. The distance b of the radius center 36, or the radius central line from an wall inner side 38 of the passage opening 28 and the seat radius R have the same value, so that the seat radius R merges tangentially into the cylindrical wall inner side 38 of the passage opening 28.

The surface $A_{ND}$ relevant to the flow rate can be calculated for this seat geometry using the formula $A_{ND}=\pi*(ND/2)^2$, where $\pi$ is the circular number.

In contrast, the surface relevant to the sealing force, which corresponds to the sealing surface $A_D$, is larger as the sealing element 30 contacts the valve seat 26 in the area of the circumferential rounding 34 when the valve 10 is closed. In the example shown, it is calculated using the formula $A_D=\pi*(ND/2+R)^2$. The sealing force to be applied is directly proportional to the sealing surface $A_D$.

In comparison, FIG. 5 shows the valve seat 26 of the valve 10 according to the disclosure from FIGS. 1 to 3.

It encloses a circular, cylindrical passage opening 28 with the nominal diameter ND and has a closed circumferential, continuously equal rounding 34 on a side facing the sealing element 30.

In each cross-sectional plane passing through the central axis of the passage opening 28, the rounding 34 has an identical seat radius R. It defines an annular sealing line 40 at the valve seat 26, which corresponds to the point closest to the sealing element 30 in the open state of the valve 10.

The distance b of the radius center 36, or the central line of the seat radius R, from a cylindrical wall inner side 38 defining the passage opening 28 is here smaller than the seat radius R. The area of the wall inner side 38 from which the distance b to the radius center 36 of the seat radius is measured has the nominal diameter ND.

The diameter of the sealing line 40 is therefore smaller than the sum of the nominal diameter ND and twice the seat radius R.

In the example shown, the sealing force-relevant surface, or sealing surface $A_D$, is calculated using the formula $A_D=\pi*(ND/2+b)^2$, where: b<R. For the same nominal diameter ND, it is smaller than the sealing surface $A_D$ of the conventional valve seat 26 described above.

Consequently, the force to be applied to the sealing element 30 for sealing is also lower. With the force applied, the mechanical loads on the sealing element also decrease when the valve 10 is closed or opened, which leads to an increased service life of the valve 10 according to the disclosure.

In the valve 10 shown in FIG. 5, the seat radius R does not merge tangentially into the inner wall 38 of the passage opening 28 as in conventional valves 10. Here, the transition area 42 has an edge 44. However, it is preferably offset into the passage opening 28 so far away from the sealing line 40 that there is no contact between the edge 44 and the sealing element 30 in the fully closed valve state.

The sealing element 30 thus contacts the valve seat 26 exclusively in the area of the seat radius R. It is thus ensured that there is no edge contact of the sensitive elastomer, which could lead to accelerated wear.

Figure 6:
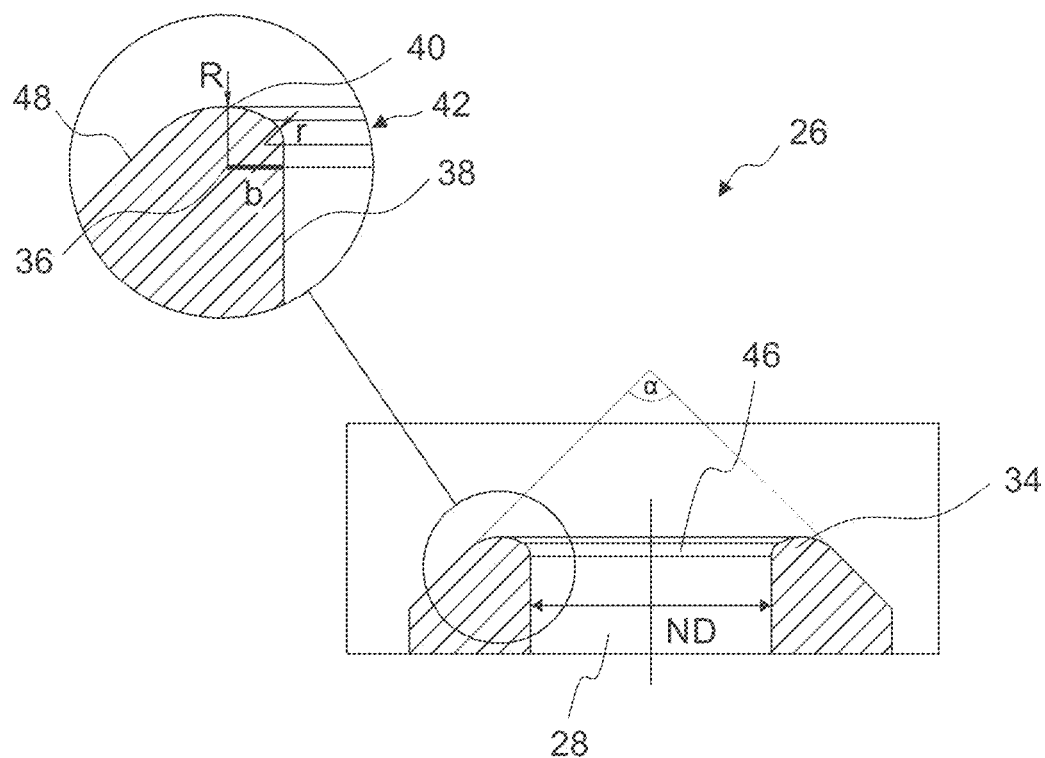
FIG. 6 shows a schematic cross-sectional view of a valve seat of a valve according to the disclosure in a second variant embodiment.

FIG. 6 shows a second variant embodiment of a valve seat 26 of a valve 10 according to the disclosure. This corresponds in essential features to the embodiment of FIG. 5, so that only the differences will be discussed below. Identical and functionally identical elements are marked with the same reference numerals.

Also in the case of the valve seat 26 shown in FIG. 6, the distance b of the radius center 36, or the central line of the rounding 34 from the wall inner side 38 of the passage opening 28 is smaller than the seat radius R.

However, the transition area 42 has no circumferential edge 44, but a transition rounding 46 having a transition radius r. The transition radius r is smaller than the seat radius R by at least a factor of 10.

In the example shown, r is 0.1 mm. This permits technically simple production without the use of special tools.

As shown in FIG. 6, the transition radius r runs tangentially into the cylindrical wall inner side 38 of the passage opening 28 having the nominal diameter ND, so that there is a smooth transition. Thus, there is less risk of damage to the sealing element 30 than in valve embodiments having circumferential edges 44 or chamfers.

Further valve seat geometries are of course conceivable, particularly those in which the transition area 42 has an increasing continuous curvature in the direction of the passage opening 28, which finally merges tangentially into the wall inner side 38 of the passage opening 28.

The valve seats 26 shown in FIGS. 5 and 6 also have a cone section 48 into which the seat radius R merges tangentially radially outwards. The cone angle α here lies in a range from 80° to a maximum of 110°. In the example embodiment, this avoids turbulence in the fluid flow as it passes through the valve 10, so that a laminar flow is achieved.

For example, the valve seats 26 shown in FIGS. 4, 5 and 6 may each have a nominal diameter ND of 4 mm and a seat radius R of 0.3 mm. The flow-relevant surface $A_{ND}$ is thus 12.57 mm² for each of the three valve seat geometries.

For the conventional valve seat 26 in FIG. 4, the sealing force-relevant surface $A_D$ of 16.62 mm² is achieved in accordance with the above formula.

In contrast thereto, the sealing force-relevant surface $A_D$ of the optimized valve seats 26 of FIGS. 4 and 5 is only 15.2 mm² for the same nominal diameter ND and seat radius R and a distance b of 0.2 mm. Compared with the conventional valve seat 26, the sealing force-relevant surface $A_D$ is therefore approx. 9% smaller.

If the same consideration is made with otherwise identical parameters for valve seats 26 having a nominal diameter ND of 1.6 mm, a flow-relevant surface $A_{ND}$ of 2.01 mm², a sealing force-relevant surface $A_D$ of the conventional valve seat 26 of 3.8 mm² and a sealing force-relevant surface $A_D$ of the optimized valve seats 26 of 3.14 mm² are achieved. The sealing force-relevant surface $A_D$ and thus also the sealing force to be applied of the valve 10 optimized according to the disclosure is 17% lower here than that of the conventional valve 10.

The sealing force reduction which can be achieved by means of the described valves 10 according to the disclosure thus depends on the nominal diameter ND.

Figure 7:
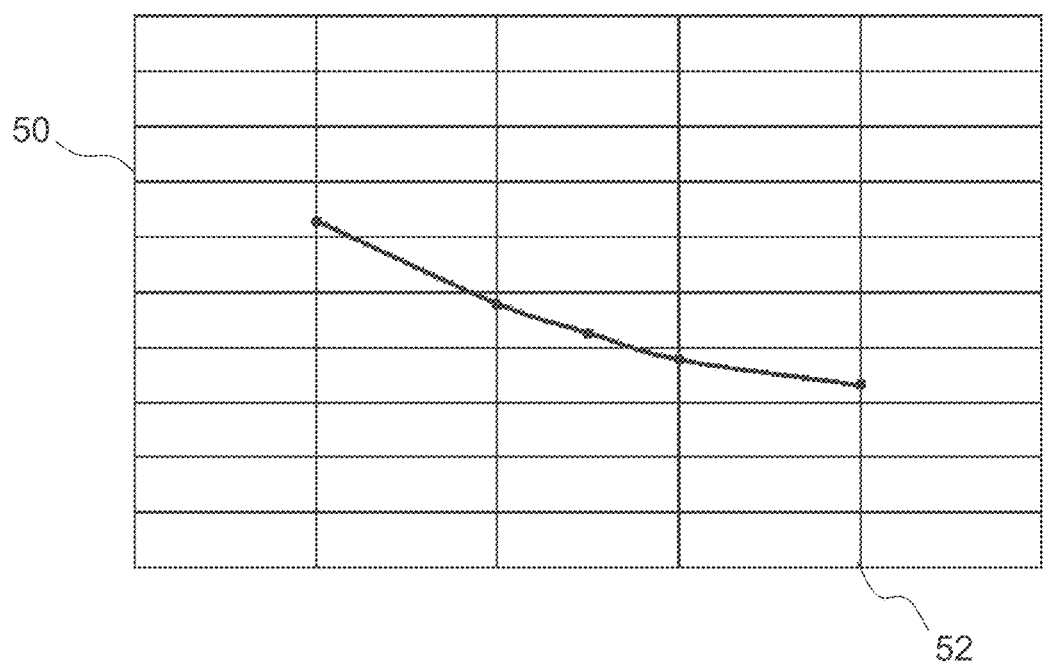
FIG. 7 shows a diagram showing a maximum fluid pressure which can be sealed by a valve over the seat radius R.

Furthermore, the achievable sealing force reduction also depends on the seat radius R, as shown in FIG. 7. The figure shows a graphical plot of a maximum fluid pressure that can be sealed by a valve 10 on the Y axis 50 versus the seat radius R on the X axis 52. In the example shown, the range of values of the Y axis 50 is between 0 and 20 bar and the range of values of the X axis 52 is between 0 mm and 0.5 mm.

The smaller the seat radius R, the higher the sealable pressure that the valve can achieve. In practice, however, the smallest possible seat radius R is limited by the load capacity of the sealing element 30. In the closed state of the valve, a very small seat radius R results in a small contact surface between the valve seat 26 and the sealing element 30, which in turn causes high local surface pressures and can negatively influence the life expectancy of the valve 10.

Figure 8:
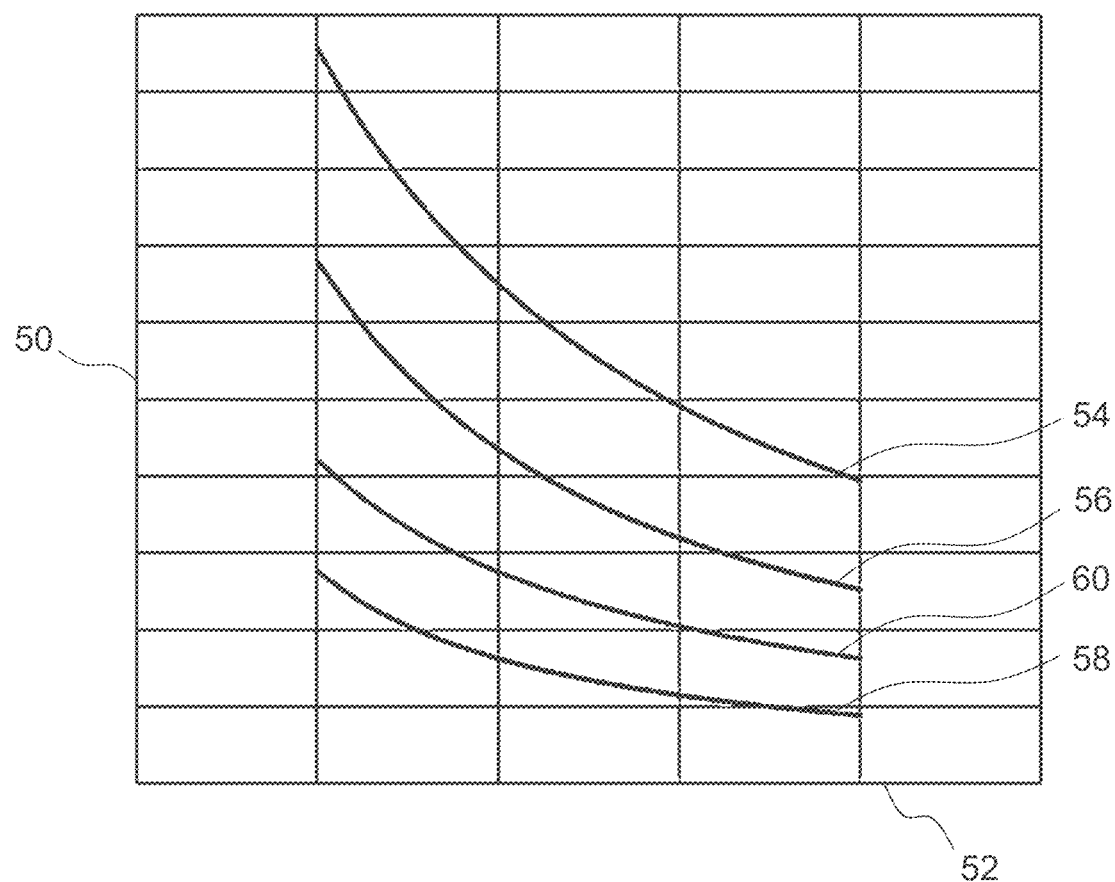
FIG. 8 shows a diagram illustrating a percentage sealing surface reduction which can be achieved by means of a valve according to the disclosure compared with a conventional valve, as a function of the nominal diameter ND for various valve geometries.

FIG. 8 shows that the achievable sealing force reduction may in particular also depend on the ratio of the nominal diameter ND to the distance b.

In the diagram, the relative sealing force reduction achievable compared to a conventional valve 10 is plotted on the Y axis 50 against the nominal diameter ND on the X axis 52. In the example shown, the range of values on the Y axis 50 is between 0 and 50% (upper end of the Y axis) and the range of values on the X axis 52 is between 0 mm and 5 mm.

A first graph 54 in FIG. 7 shows the achievable sealing force reduction for a valve 10 with b=0.15 and b/ND=0.375, a second graph 56 for a valve 10 with b=0.15 and b/ND=0.5, a third graph 58 for a valve 10 with b=0.15 and b/ND=0.75, and a fourth graph 60 for a valve 10 with b=0.3 and b/ND=0.75.

The smaller the ratio b/ND, the lower the sealing force to be applied for a given nominal diameter ND. However, the ratio b/ND cannot be chosen arbitrarily small, since otherwise the mechanical load on the sealing element 30 would increase again.

As has been shown, valves 10 having a ratio b/ND between 0.75 and 0.375 have a particularly low sealing force to be applied and a long service life. Therefore, this range of values is advantageous for valves 10 according to the disclosure.

For the same reason, nominal diameters ND between 0.5 mm and 6 mm, seat radii R between 0.2 mm and 0.4 mm and ratios of the seat radius R to the nominal diameter ND in the range from 0.05 to a maximum of 0.5 are also preferred.

The invention claimed is:

1. A valve, comprising a sealing element and a valve seat which surrounds a passage opening having a nominal diameter, the valve seat having on a side facing the sealing element a closed circumferential rounding which, in a cross-sectional plane which extends through a central axis of the passage opening, has a seat radius, wherein a distance of a radius center of the seat radius from a wall inner side defining the passage opening is smaller than the seat radius, wherein the seat radius merges into the wall inner side of the passage opening in a transition area, and wherein the transition area comprises a transition rounding having a transition radius which is smaller than the seat radius of the radius center of the seat radius from the wall inner side.

2. The valve according to claim 1, wherein a ratio of the distance to the seat radius is in a range from 0.375 to a maximum of 0.75.

3. The valve according to claim 1, wherein the transition area has an edge or a chamfer.

4. The valve according to claim 1, wherein the transition radius is smaller than the distance.

5. The valve according to claim 4, wherein the transition radius merges tangentially into the wall inner side and has a value of 0.1 mm.

6. The valve according to claim 1, wherein the valve seat defines an annular sealing line defining the point closest to the sealing element in the open state of the valve, the sealing line having a diameter which is smaller than the sum of the nominal diameter and twice the seat radius.

7. The valve according to claim 1, wherein a ratio of the seat radius (R) to the nominal diameter has a value which is in the range of 0.05 to a maximum of 0.5.

8. The valve according to claim 1, wherein the nominal diameter has a value which ranges from 0.5 mm to 6 mm.

9. The valve according to claim 1, comprising a housing part, wherein the valve seat is a component of a housing part.

10. The valve according to claim 9, wherein the housing part delimits a fluid chamber.

11. The valve according to claim 9, wherein the valve seat is a free end of a sleeve-like section projecting from the housing part.

12. The valve according to claim 1, wherein the sealing element is made of an elastomer at least in the area of contact with the valve seat.

13. The valve according to claim 1, wherein in the open state, the sealing element has a flat surface facing the valve seat.

14. The valve according to claim 1, wherein in the fully closed state, the sealing element contacts the valve seat exclusively in the area of the seat radius.

15. The valve according to claim 1, wherein the area of the wall inner side from which the distance to the radius center of the seat radius is measured has the nominal diameter.

16. A valve, comprising a sealing element and a valve seat which surrounds a passage opening having a nominal diameter, the valve seat having on a side facing the sealing element a closed circumferential rounding which, in a cross-sectional plane which extends through a central axis of the passage opening, has a seat radius, wherein a distance of a radius center of the seat radius from a wall inner side defining the passage opening is smaller than the seat radius, wherein the seat radius merges into the wall inner side of the passage opening in a transition area, and wherein the transition area has an increasing continuous curvature in the direction of the passage opening.

17. The valve according to claim 16, wherein the continuous curvature merges tangentially into the wall inner side of the passage opening.

18. A valve, comprising a sealing element and a valve seat which surrounds a passage opening having a nominal diameter, the valve seat having on a side facing the sealing element a closed circumferential rounding which, in a cross-sectional plane which extends through a central axis of the passage opening, has a seat radius, wherein a distance of a radius center of the seat radius from a wall inner side defining the passage opening is smaller than the seat radius, and wherein the seat radius merges radially outwards into a cone section.

19. The valve according to claim 18, wherein the seat radius merges radially outwards tangentially into the cone section.

\* \* \* \* \*